United States Patent [19]

Benjamin

[11] Patent Number: 5,647,018
[45] Date of Patent: Jul. 8, 1997

[54] METHOD AND APPARATUS FOR GENERATING IMAGES

[75] Inventor: Ralph Benjamin, Bristol, England

[73] Assignee: Imperial College of Science, Technology and Medicine, London, England

[21] Appl. No.: 232,129

[22] PCT Filed: Oct. 27, 1992

[86] PCT No.: PCT/GB92/01969

§ 371 Date: Jul. 18, 1994

§ 102(e) Date: Jul. 18, 1994

[87] PCT Pub. No.: WO93/09512

PCT Pub. Date: May 13, 1993

[30] Foreign Application Priority Data

Oct. 28, 1991 [GB] United Kingdom ............... 9122843

[51] Int. Cl.$^6$ ........................................ G06K 9/00
[52] U.S. Cl. ............... 382/128; 382/268; 356/301; 356/349; 428/219; 250/492.1; 250/398
[58] Field of Search ..................... 382/128, 268; 356/301, 349; 250/492.1, 398; 428/219, 301

[56] References Cited

U.S. PATENT DOCUMENTS

| | | | |
|---|---|---|---|
| 4,407,008 | 9/1983 | Schmidt et al. | 356/301 |
| 4,498,770 | 2/1985 | Corwin et al. | 356/349 |
| 4,621,911 | 11/1986 | Lanni et al. | 350/524 |
| 5,421,330 | 6/1995 | Thirion et al. | 382/128 |

FOREIGN PATENT DOCUMENTS

WO9220032  11/1992  WIPO ............... G06F 15/62

OTHER PUBLICATIONS

Giblin et al: "Reconstruction of surgaces from profiles", First International Conference on Computer Vision Jun. 8, 1987, pp. 136–144.

Van Hove et al: "A silhouette–slice theorem for opaque 3D objects", ICASSP85.International Conference on Acoustic, Speech, and Signal Processing, vol. 2, Mar. 26, 1985, pp. 933–936.

Primary Examiner—Jose L. Couso
Assistant Examiner—Anh Hong Do
Attorney, Agent, or Firm—Cushman, Darby & Cushman IP Group of Pillsbury Madison & Sutro LLP

[57] ABSTRACT

A method of generating images of a specimen containing at least two regions of different opacity to the passage of radiation comprises irradiating the specimen with radiation from a radiation source, detecting the radiation to produce a plurality of signals indicative of the amplitude of the radiation passing through the specimen in a corresponding plurality of different directions and processing the signals to derive further signals indicative of contours of maximum local discontinuity in opacity or texture thereby providing an indication of the position of the three-dimensional boundary surface between the two regions.

38 Claims, 11 Drawing Sheets

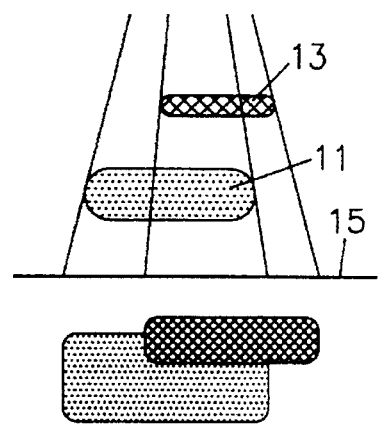 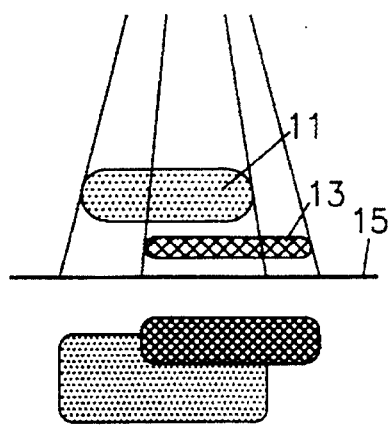
Fig. 1a          Fig. 1b
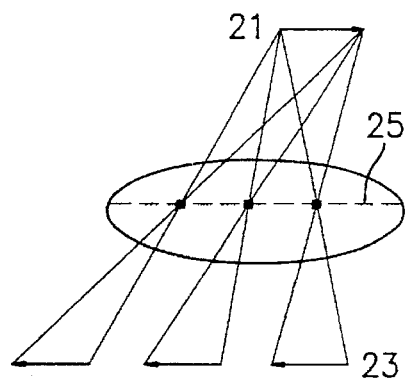 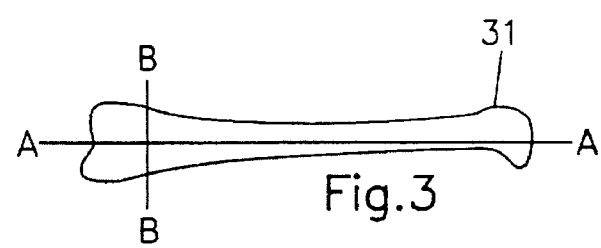
Fig. 2          Fig. 3
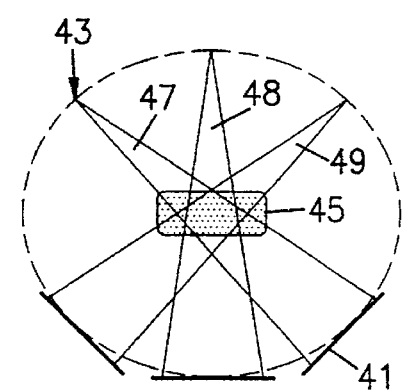 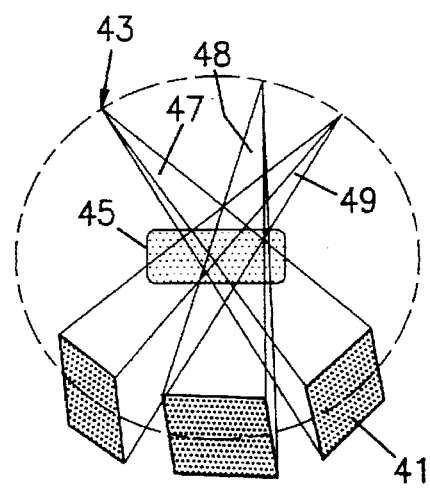
Fig. 4          Fig. 5

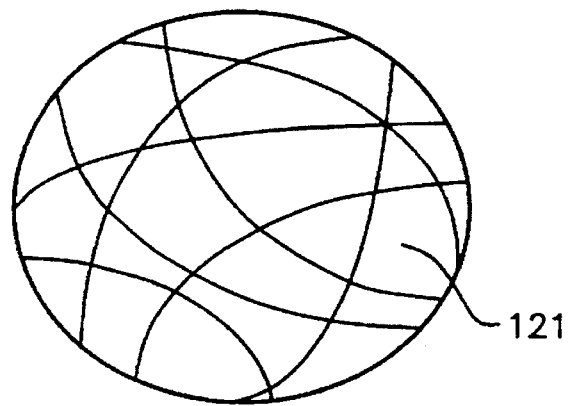
Fig.11　　　　　Fig.12
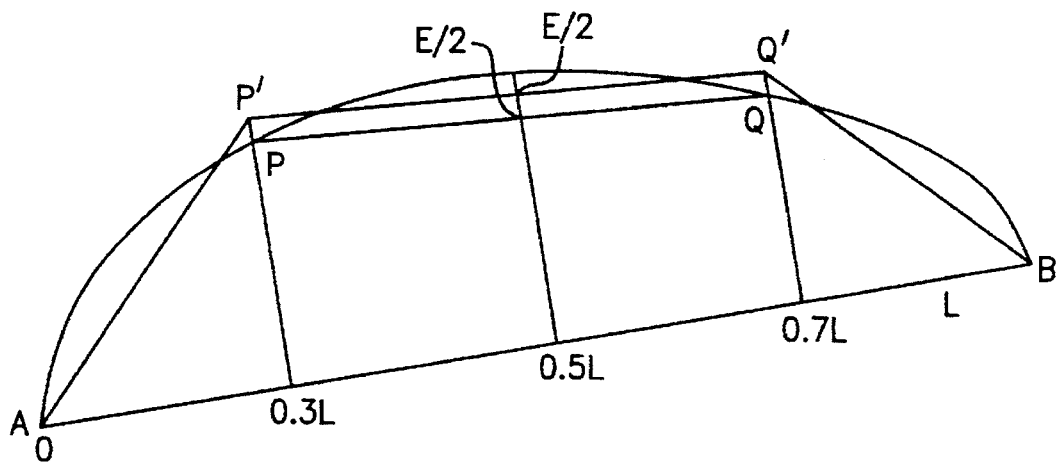
Fig.13
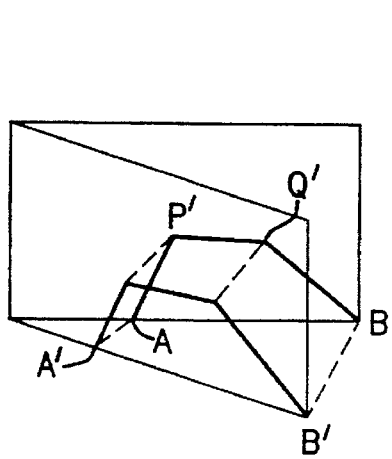
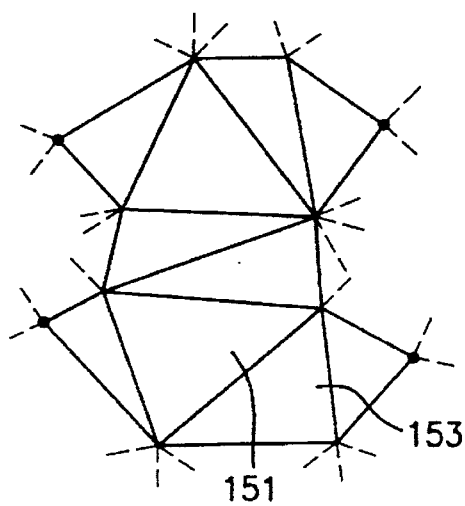
Fig.14　　　　　Fig.15

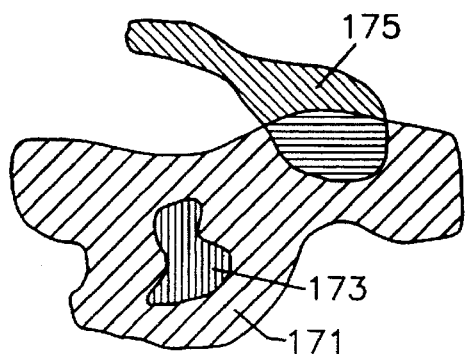
Fig. 17
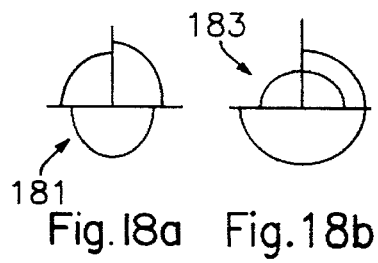
Fig. 18a  Fig. 18b  Fig. 18c
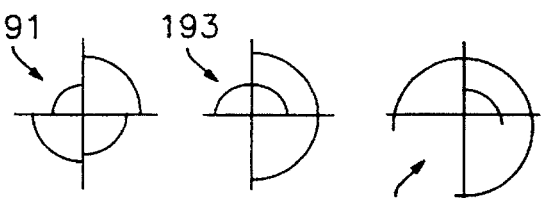
Fig. 19a  Fig. 19b  Fig. 19c
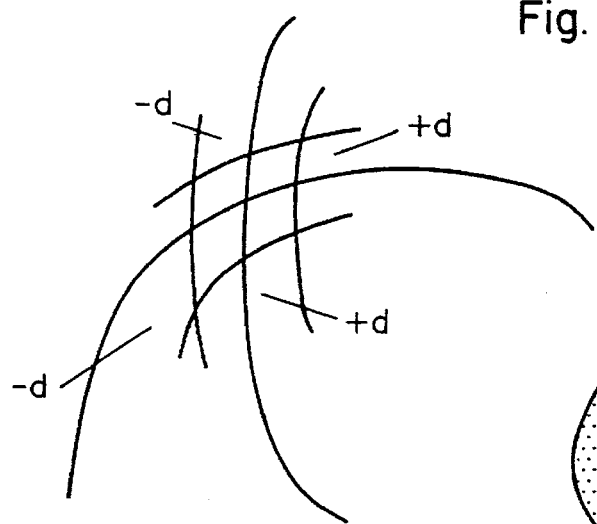
Fig. 20
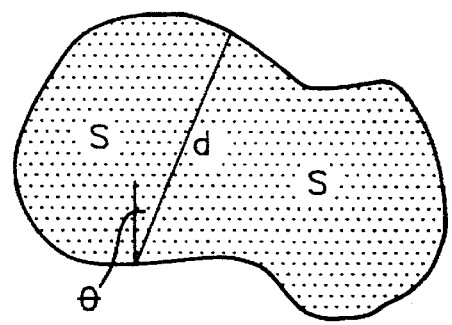
Fig. 21

METHOD AND APPARATUS FOR GENERATING IMAGES

FIELD OF THE INVENTION

This invention relates to three-dimensional image generation using a variety of types of interrogating radiation, including electromagnetic, particle and acoustic radiation. In particular, it finds application in the processing of images produced with X-rays.

BACKGROUND OF THE INVENTION

In conventional X-ray tomography the apparatus produces images of a single slice of an object by moving an X-ray camera and the image plate in a complementary manner so that everything is blurred except for a predetermined plane. Commercial machines produce images of a number of separate slices, moving the X-ray machine to produce a planar picture and then moving the object under test in the Z direction to produce a planar picture at different slices. That needs more total pictures than the views spread over a solid angle and it produces a cruder representation of a three-dimensional image because volume cells intermediate between slices have to be derived by interpolation.

Conventional tomography thus produces images of discrete slices normal to the axis of objects of short axial length. It is more common, however, to require images to discrete slices normal to the axis of a long object. The established form of computer tomography (CT) is designed to do this. It does it by taking a number line images, at different viewing angles in the plane of each such slice (typically 360–1440 views, taken at 1° to ¼° intervals). These are then used to compute the corresponding slice image. However, the invention—and even the established form of computer tomography—is better understood by first postulating an extension of computer tomography which, unlike existing systems, would produce a true three-dimensional mapping of the X-ray densities (i.e. opacities) of a complete set of symmetrical, equally-spaced volume cells (voxels), in place of merely producing such information for each of a limited number of parallel slices through the relevant object. This hypothetical version of computer tomography might map a cubical volume $L^3$ into $(L/c)^3$ voxels of size $c^3$. In its simplest form, this postulated ideal form of computer tomography would involve $L/c$ distinct X-ray projections, of $(L/c)^2$ pixels. Each pixel represents the aggregate density of a column of $L/c$ voxels. The individual densities of all voxels are then computed by $(L/c)^3$ simultaneous equations. No assumptions about the features of the specimen are involved. The resulting picture is fully three-dimensional, amenable to three-axis rotation, slicing etc.

In practice, the voxels are not independent: signal/noise considerations require a significant degree of smoothing and integration (by the human eye or brain and/or by a computer algorithm), which causes the effective image to be composed of reasonably smooth multi-voxel elements.

We have found that it is possible to make use of this assumption to simplify data extraction, storage and processing.

The processing may be simplified by treating an object under test as a set of component objects, each defined by one or more closed surfaces, where the precision of the surface shape of these component objects should ideally match the resolution of the sensor system. Indeed, for smoothly-varying surfaces, a least mean-squares or similar fit can produce a precision superior to that of the individual constituent measurements. Furthermore these component objects are generally of individually uniform specific density, and of reasonably "well-behaved" shape. (Complex shapes may be broken down into multiple constituent objects of simpler shape.)

These component objects can be cross-identified, between different views, by projection on to the axis common to each pair of such views. Each such projection also defines the three-dimensional position of two outermost surface points of the object (as projected on to this common axis), with a precision matching that of the source pictures. Thus n views generate $n(n-1)$ such points on each object surface, and these points cluster most closely in the areas of greatest curvature on these surfaces. The line contour segments between the points can also be derived with considerable precision. This generates a network of $n(n-1)+2$ surface cells. The three-dimensional shape of these cell surfaces can also be derived with good precision. (If there are any inflexions or sharp corners or other point singularities, their position in three dimensions can similarly be identified from any two suitable projections, thus producing some additional nodes and meshes in this network.)

On this basis, about ten views, yielding 92 cells per surface, are likely to be to be sufficient for most applications. At the other extreme, 32 views (still a minute number compared with conventional computer tomography) would generate 994 cells. This permits the use of much simpler algorithms to generate the network of line-segments linking the points and to derive the surface of the resulting mesh cells. We have found, in practice, tolerable reconstructions can be obtained with as few as five source images, whilst anyone wishing to ignore the curvature of line segments might wish to use up to 100 source views.

The representation of the observation volume as a set of three-dimensional objects matches the physical reality. This enables the technique to cope with higher noise levels than equivalent conventional systems. It also provides a convenient basis for determining specific densities and for providing user-friendly facilities of object selection, enhancement, rotation, slicing, and general manipulation.

It is possible to regard a specimen as composed of a limited number of solid "objects", which each:

1. Comprise a substantial number of voxels;
2. Have a reasonably "well-behaved" geometric shape;
3. Have a reasonably smoothly-varying projected density.

When applying the invention to X-rays, used for medical applications, a significant proportion of clinical situations match this scenario. A single functional physiological entity of more complex shape will then normally comprise two or more "objects" of this type. Diagnosable anomalies are departures from the expected size, shape and density of these objects or the presence of "unscheduled" extra objects. The requisite three-dimensional information can be extracted from, say, about ten X-ray projections from different directions.

The resultant picture is amenable to three-axis rotation and to slicing, just as with three dimensional pictures extrapolated from conventional forms of tomography. In addition, however, any desired subset of objects can be readily selected or deleted (or enhanced, attenuated or colored) at the user's discretion. Thus this approach gives the benefits of conventional forms of tomography—and some further user-friendly features—with dramatically fewer X-ray exposures and reduced computation.

SUMMARY OF THE INVENTION

According to the present invention there is provided a method of generating images of a specimen containing at least two regions of different capacity to the passage of radiation comprising irradiating the specimen with radiation from a radiation source, detecting the radiation with a radiation detector sensitive to the radiation to produce a plurality of signals indicative of the amplitude of the radiation passing through the specimen in a corresponding plurality of different directions characterized in that the plurality of signals are processed to derive further signals indicative of contours of maximum local discontinuity in opacity or texture thereby providing an indication of the position of the three-dimensional boundary surface between the two regions.

Preferably the further signals are subject to further processing to subdivide the representation of the surface into a plurality of elementary substantially planar surfaces to facilitate the manipulation of images of the boundary surface.

BRIEF DESCRIPTION OF THE DRAWINGS

The invention will now be particularly described by way of example with reference to the accompanying drawings, in which:

FIGS. 1a and 1b show obscuration of objects;

FIG. 2 illustrates conventional tomography

FIGS. 3 to 5 show arrangements of computer tomography and its extension with linear (FIG. 3) and array detectors (FIGS. 4 and 5);

FIGS. 8 to 28 are diagrams used to explain the method in accordance with embodiments of the invention;

DESCRIPTION OF THE PREFERRED EMBODIMENTS

Figure 6:
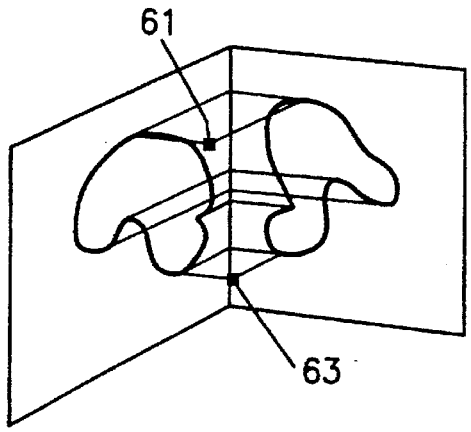
FIG. 6 is an illustration showing two views of a complex shape.

With conventional single X-rays, e.g. for orthopaedic medical applications or airport luggage screening, each picture element (pixel) represents the aggregate attenuation due to the X-ray densities of all the volume cells (voxels) traversed by the corresponding ray: Such pictures, valuable as they are, suffer from a number of significant limitations:

There is no indication of absolute or even relative depth;

An opaque object 13, anywhere in the ray path, obscures any other object 11 in that path, be it nearer or farther than the opaque object. (FIGS. 1a and 1b);

the single two-dimensional view may be little help for visualizing the three-dimensional shape of objects.

the picture is depth-dependent and hence distorted (FIGS. 1a and 1b):

Let the photographic plate (or equivalent sensor array) be the X,Y plane 15 as shown in FIGS. 1a and 1b, with Z=0. A point source at X=0, Y=0, Z=R will then map any object point x,y,z on to the image point x×R/(R−z), y R/(R−z)

It is therefore normal practice to take two or three views at radically different angles. However, even then, some quite demanding mental gymnastics may be required to resolve the images into a set of objects, deduce their position in three-dimensions, and visualize their three-dimensional shape. Certainly the resulting information is less complete or precise than desirable for planning detailed surgical procedures, and so a patient may have to be cut up more drastically than should be necessary. It is certainly less than ideal for focusing the appropriate damaging radiation on to tumours, kidney stones etc. The information is totally inadequate for the direct control of surgical instruments, or for defining the precise size and shape of dental or orthopaedic prosthetics, and controlling their manufacture. Hence the provision of prosthetics may involve separate surgical operations for several consecutive trial fittings, before an acceptable device can be permanently implanted.

Since the surgeon is trained to visualise small three-dimensional objects from a stack of suitably spaced microtome slices, viewed in his microscope, conventional tomography seeks to provide similar information from his X-ray equipment. ("Tomography" has the same etymological root as "microtome".) In this technique, the point-source of radiation is above the target object, and the photographic plate for (or equivalent sensor array) is below it and parallel to the desired slice. The source and sensor are then progressively displaced, in opposite in directions, (normally in one, but ideally in two dimensions) parallel to the slice plane (FIG. 2). Provided these displacements are proportional to the respective spacings from the chosen slice plane, the ray passing through any given object voxel in the selected slice plane will always terminate at the same image pixel, producing an enlarged but undistorted picture of the selected slice. However, at all other levels in the target object, the ray sweeps through a two-dimensional array of distinct voxels, thus smearing their contributions to this pixel into a substantially uniform grey background to the picture, which can be largely eliminated by spatial low-pass filtering. However, the contrast so achieved is somewhat limited.

Conventional tomography is well suited to producing views in planes parallel to the major axis of a long thin object, see A—A in FIG. 3. However, this is precisely the information which can best be visualized from a single conventional X-ray. Hence the user is far more interested in slice views such as shown in FIG. 3. Computer Tomography (CT) meets this demand. Computer Tomography uses a line array of sensors, in the plane of the desired slice, and a point source, facing it on the opposite side of the object (FIG. 4). Both rotate through equal and opposite angles through 360°, so that views through that slice can be taken, typically at intervals of 0.25°. (In principle, 180° rotation would be sufficient but, with divergent sources, reciprocal views are not identical, and continuous rotation, possibly in a spiral scan, is mechanically more convenient.) In each view, each ray generates, in the corresponding sensor pixel, a signal which defines the aggregate attenuation due to all the voxels (within that slice) traversed by the ray.

As indicated in Table 1, a 1,000-point sensor, with a 1,000-point resolution along each ray, can then produce a 1,000-line ($10^6$ pixel) image. However, this requires 1,000 independent exposures to collect the necessary data. Assume we need to distinguish ten discrete voxel density values, with an average value of 5. Each image pixel then gives the sum of 1000 such voxel densities. Hence we need to define this aggregate density of around 5000 with an accuracy of ±0.5, i.e. a signal/noise ratio of 80 dB. Each slice undergoes 1000 such irradiations, thus exposing the patient to a total radiation dosage which is at the limit of permissible risk, acceptable only in the case of critical medical need for the information.

Furthermore, all the irradiation, for all the slices, has to take place in very rapid succession: The patient has to keep quite still and hold his breath, to minimize movement until the records from all the slices are completed. This entails an intensity and continuity of X-ray generation which is near the limit of tube technology, and can be achieved only by aiming the X-ray beam at a source spot at the edge of rapidly-rotating metal targets, to prevent melting. Finally, each slice requires the determination of one million unknown voxel densities from 1000 simultaneous equations of 1000 terms each, normally using a specialized array processor.

Computer tomography produces very high-quality two-dimensional images, with a resolution, typically, of 1000 lines. The third dimension, however, depends on the interpolation between slices. Normally 30 or 40 slices are taken; very exceptionally this might be increased up to 100. However, the inter-slice spacing can be adjusted so that the set of slices just brackets the region of interest.

In some instances, the computer tomography source beam has been broadened somewhat in the axial dimension, normal to the slice, and the sensor array has accordingly been widened from a single-line array to an elongated rectangle, so as to yield full, uniform three-dimensional resolution within slices of moderate width, and so—via multiple slices—in the whole volume of interest. This, of course, increases the computational load and data-storage requirement even further.

Information defining the full three-dimensional volume could be found by a symmetric extension and generalization of the principle, employed in the generation of a single two-dimensional computer tomography slice, as illustrated in FIG. 5. However, this scheme would employ a full-width two-dimensional detector array. In place of deriving a two-dimensional slice distribution from a number of one-dimensional recordings spread over 180° (or 360°), it derives the full three-dimensional volumetric density distribution from a number of two-dimensional recordings spread over a solid angle of $2\pi$ (or $4\pi$) Table 2 (analogous to Table 1) shows that 1,000 exposures, each of 1,000 by 1,000 pixels, would be required to map the independent densities of a full set of 1,000 by 1,000 by 1,000 (i.e. $10^9$) voxels. The spherical symmetry of data acquisition, in this scheme, optimally matches the symmetry of three-dimensional space. In other respects, however, this scheme is similar to the "fan-beam tomography" of the preceding paragraph.

The schemes outlined above all acquire, process and analyze data as if the user were interested in a set of $10^9$ independent voxel densities. In practice, of course, the user could not interpret such single cells, and he is only interested in discrete physiological entities and their characteristics. It is desirable to look for discrete 'objects' of relatively 'well-behaved' shape, each containing substantial number of voxels of similar specific density. The aim is:

To provide high precision in three-dimensions;

To match the acquisition and representation of the data more nearly to their nature and use, thus simplifying acquisition and making displays more responsive to the user's wishes and needs;

To condense and simplify the data and to permit more efficient data and image manipulation;

To reduce the number of separate irradiations of each object voxel—roughly 100-fold;

To reduce the intensity of each individual constituent exposure—at least 100-fold;

Thus to make the aggregate exposure small enough for wide use, whenever helpful to the diagnostician or surgeon.

An object-based scenario is excellently matched to non-medical applications, such as industrial inspection, and security inspection at airports etc. It is also an adequate representation of a high proportion of medical applications, particularly orthopaedic ones. This object-nature of our subject material is the basic assumption underlying our approach. In fact, we do not depend on the source material being very simple in shape: Any pronounced change or of projected density—or of texture—will be treated as an interface to another "object". The scheme can also accommodate objects of spatially varying density, or indeed some totally non-object-like material.

Let us consider what is special in object-based images and how can we benefit from it. An object is any region in space enclosed by a discontinuity in density or texture. Each projected view of an object generates the corresponding outline, in the image plane. Any pair of such image planes intersect on a common axis. Hence we can identify, on both views, the extremities of the object as projected on to this axis. (FIG. 6). (These points correspond to the intersection of the two outline loci on the real object.) Thus we obtain two 'common points' 61–63 whose two-dimensional position is known in two distinct planes, and so we define their position in three dimensions.

The incident radiation is divergent, and hence the pictures produced are generally both enlarged and distorted. However, each point on either view will define precisely the direction of the ray linking it to the corresponding point source. Hence we displace both points incrementally, on either side of their initial position, until we find the pair of positions for which the corresponding rays intersect (or, at worst, their minimum separation is least) This intersection—exact or interpolated, is then the required three-dimensional location. A simple algorithm of progressively smaller incremental steps can 'home in' on to this intersection (or quasi-intersection) in a small number of iterative attempts. If the shape is re-entrant, there will normally be two additional local 'extremities' in both views, thus providing the three-dimensional location of two further points. If there are any sharp corners or other singularities these, too, can be identified. (FIG. 6.) Indeed, the more complex the shape, the greater is the number of points required, but the greater is also the number of points generated. (Any sharply discontinuous attachment or hollow would generate a discontinuity, in the projected cumulative density, and so would be created as a separate object.) To set a lower limit, let us assume that we are dealing with an object of simple shape, with no deep dents or awkward projections and no sharp corners to provide further identifiable points. Thus, for each pairing of two views, just two common points can then be defined in three-dimensions, and so n views generate $n(n-1)$ pairings. (Table 3) We have found that approximately ten views will generally be sufficient (with 30 views as an extreme upper limit).

The point of intersections of two locus lines is subject to a tolerance proportional to the cosecant of their subtended angle. With ten views the most closely spaced views differ by 45°, which should cause no problems. However, with 30 views the most closely spaced views differ by only 25°. If we therefore preclude each view from pairing with four near neighbors, this still leaves 30×25/2 view pairings, a minimum of 750 points.)

Figure 7:
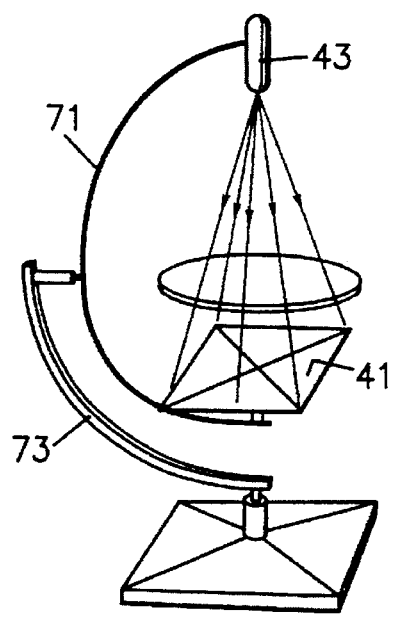
FIG. 7 shows a three-dimensional scanning arrangement.

The viewing axis of the source 43 and diametrically opposite two-dimensional sensor 41, can be steered in one angular dimension by rotating the inner arc 71 of FIG. 7 about a horizontal axis, similarly to existing computer tomography equipment. However, in place of sliding the subject axially through the computer tomography scanner, the second dimension is obtained by rotating either the platform on which the subject rests or the outer arm 73 of FIG. 7 about a vertical axis.

To spread the viewing angles uniformly, we link them to appropriate features of a regular polyhedron. Ten directions are obtained from the centers of half the faces of a regular icosahedron (20-sided polyhedron); the other ten faces would merely give the reciprocals of the same axes. (With the irradiation diverging—typically by $\pm 10°$–$\pm 15°$—views from reciprocal directions are not fully identical. However, the views from the reciprocal hemisphere contribute little additional information.)

Figure 8:
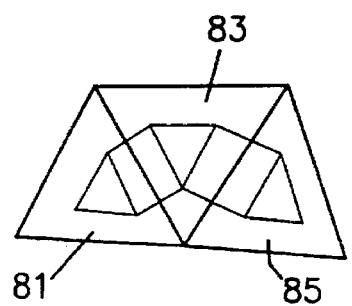

For 30 views, we place three viewing points near the corners of each relevant facet 81–85, spaced equally both from each other and from the nearest points on the two neighboring facets. (FIG. 8) Similarly, 3 points per face of an octahedron yields 12, and 4 per face (3 near the corners and 1 in the center) 16 viewing angles. The mid-points of the edges of a dodecahedron yields 15 viewing axes. In a cube, 4 points per face yields 12, and 5 per face 15 axes. In a tetrahedron, 4 points per face would yield 8 axes.

Rapid, very high-precision, two-dimensional mechanical rotation of viewing angles, around a human body stretched out at full length (or indeed relative to any other subject) would involve expensive equipment. Moreover, such mechanical movement could be psychologically disturbing to a patient. The movement would have to be sufficiently rapid that the patient can hold his/her breath and keep immobile during the relevant interval. Some residual movement, due to heartbeats, would be inevitable. Since our system requires only, say, ten views, these views are preferably provided by means of ten fixed X-ray sources and sensor arrays. The sources could however be excited in rapid succession, rather than truly simultaneously, to avoid side-scatter excitation from one source generating 'noise' in the sensor array for another source. (Groups of suitably separated sources could be activated concurrently.)

Figure 9:
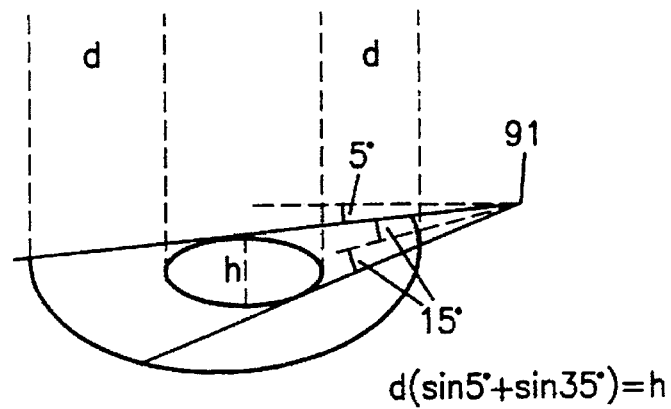
Figure 10:
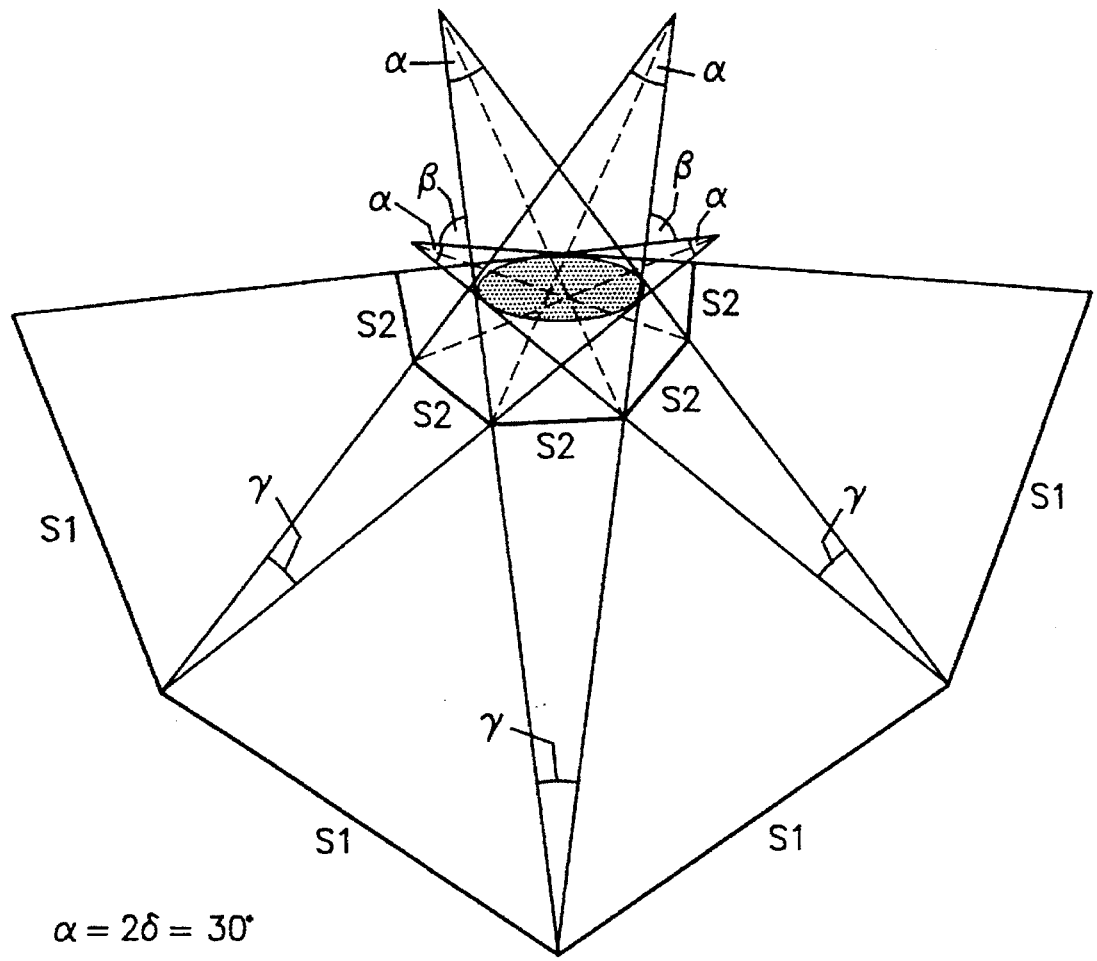

With nearest-neighbor separations of viewing axes of approximately 45°, some of the viewing axes, in the upper hemisphere, will have to be within 22.5° of the horizon. FIG. 9 uses the specific example of a source 91 at 20° elevation, with an angular spread of $\pm 15°$, to illustrate how sources can be positioned in the upper angular hemispheres to avoid obstruction of their radiation by the sensor arrays in the lower hemisphere. If the sensors are to face exactly towards the relevant source, each source must have its own sensor array. This is quite feasible, without mutual obstruction by these arrays, provided $2\delta$, the angular spread of the angle of irradiation from source to sensor array, is less than $\Theta$, the minimum angular separation between viewing axes (FIG. 10). Small values of $\delta$ require large source-to-subject spacings. This may be mechanically unwelcome, but it does avoid any claustrophobia by the patient.

The configuration of sources and sensors is preferably matched to the largest volume needing to be viewed simultaneously: as a (somewhat extreme) upper limit, say, an ellipsoid of 90 cm (length) by 60 cm (width) by 40 cm (depth). For smaller volumes, the spread of the source beams can be restricted by suitable irises. The dominant length dimension determines the source-to-subject and subject-to-sensor spacings. The biggest source-to-subject spacings could however be roughly halved, if, of our ten views, those substantially normal to the length dimension (say 4–6 views) were covered 2 distinct (sequentially excited) sources each, and by two half-length sensor screens. (The subject-to-sensor distances are however determined by the viewing angle $\delta$, and so are unchanged.) This configuration also reduces the ratio of major-to-minor axes in the source irradiation angles, and would reduce the side-scatter "noise" in the resulting picture. It may also be possible to narrow the source X-ray beams in one angular dimension and then to step scan them to restore their angular cover, thus permitting a further reduction in side-scatter noise. The sizes of the arrays would be matched to the projected views of the ellipsoid. Assuming a resolution of 2000 angular cells (anxels) for the 90 cm dimension, the average view would require approximately $(\pi/4)(1000/90)^2 (90\times 60\times 40)^{2/3}$ angular cells, i.e., for ten views, a total of 14 million resolution cells to be separately read, e.g. from photo-stimulable storage phosphor (like the "Fuji plate"). In this latter case the interrogating laser beam should be in line with the primary radiation beam. It will, furthermore, be necessary to have a separate plate for each viewing location.

The separation of the sensor screens, for distinct views, requires large separations between the subject and the sensor screens $S_1$ in FIG. 10. It is desirable to use a sensor screen closer to the subject. This permits a smaller screen, needing fewer resolvable elements, to be used repeatedly, for several views, by time-sharing the excitation of the relevant sources. This does however, require the sensor screen to be read and reset very rapidly, and it requires the screen elements to accept radiation over an appropriate range of angles. $S_2$ in FIG. 10 shows the limiting contour for a two-fold overlap of angles in one dimension. Thus the right-hand boundary of view A and the left-hand boundary of view C cross on the center-line of view B. Hence the element at that intersection would have to accept radiation over the limits of $\pm(\Theta-\delta)$. However, if the subject-to-sensor distance is marginally increased, the acceptance tolerance, for all elements, is only $\pm\epsilon=\pm(\Theta-\delta)/2$. For ten views, $\pi\approx 45°$ and $\delta=15°$, as assumed in FIG. 10, this entails $\theta=15°$.

A small part of the screen might even be common to three views, differing in two angular dimensions. However, as a rough estimate, 80% of elements will serve two views and 20% only one view. This corresponds to a 40% saving, giving a total of roughly 8.5 million resolvable elements on the screen. These elements can form a common sensor screen, covering the full solid angle of $2\pi$ in a continuously-curved surface. This surface does not need to be hemispherical, but may be suitably matched to the shape of the limiting ellipsoid. With time-sharing where necessary, subsets of this screen can cater for any number of views or any change of viewing angles, given the appropriate number of additional sources or source positions.

Smooth shapes with a monotonic change in tangent angle will establish common points at approximately equal increments of tangent angle. Interaction with 9 other views will establish 9 pairs of common points, corresponding to angular spacings of 20°. Any inflexions increase the total number of tangent points. Considering each segment of an inflexion as if it were part of a monotonically curved contour shows we maintain the condition of one point per 20° of positive or negative angular change. However, a sharp corner, will generate one additional singular point, even though it may represent a much larger angular change than 20°. (Similarly, 30 views will produce reference points at approximately 6° intervals.) Since the points defined on the objects will be substantially evenly spread, in tangent angles (not in linear separation), see FIG. 11, they cluster closely in highly-curved regions, and are widely spread in smooth, flat parts of the surface: the optimum distribution of a given number of points. Furthermore, each object generates its own set of points and their distribution automatically adapts to the size of the object. However, for small objects, the accuracy is ultimately limited by the "grain" of the sensor array.

The n(n−1) surface points are interconnected by a network of 2n(n−1) line segments whose three-dimensional track we can infer, with high accuracy, from their known end-points and their Known projected contour. The first outline drawn on a closed surface divides it into two regions. Each subsequent outline crosses each pre-existing one twice, and so adds two mesh-cells per pre-existing outline. Hence this network will define the surface as a set of n(n−1)+2 mesh cells 121. (FIG. 12). Most of these cells will be bounded by 4 line segments, but some will be triangular and some may have 5 or more sides. However, in all cases, two projected contours intersect at each vertex, so forming four quadrants. Hence these cells may be found as follows:

1. Select a vertex where less than all 4 associated quadrants form parts of already established mesh cells.
2. Select one of the associated line segments where not more than one side forms part of any already established mesh cell.
3. At the other end of this segment, select one of the two line segments of the intersecting contour, where the quadrant defined jointly by this and the original line segments does not form parts of any already established mesh cell.
4. At the other end of this further line segment, select that one of the two line segments of the intersecting contour whose end point is nearest the starting vertex.
5. Repeat step 4, for consecutive further line segments, until the starting vertex is regained.

The sides of the cells so formed will generally be curved and, in a cell of four or more sides, the corners will not normally be coplanar. We have devised algorithms for generating a curved surface, fitting these conditions. However, we prefer to represent each curved line segment by three straight lines, in the following manner.

Assuming the curved segment is equivalent to a circular arc, the optimum 3-line approximation is obtained as illustrated in FIG. 13:

Let the straight line of length L, joining A and B, the end-points of the line segment, be the X axis, with A as the origin.

Find points P and Q on the curve, corresponding to X=0.3 L and X=0.7 L respectively, and construct the line PQ.

At X=0.5 L, find E, the Y-difference between line PQ and the curved line segment.

Form line P'Q', parallel to PQ but displaced by E/2 in the Y direction.

The 3-line approximation is then AP'Q'B.

A simple analysis shows that, for a circular arc, this representation reduces the peak and mean positional errors 16-fold, compared with the straight line AB. The reduction in the peak gradient error is only 2.7-fold, but realistic surface gradients may be restored, following all other image manipulation operations, by appropriate smoothing.

The true positions of A' and B', the end-points of any given line segment, are known in three-dimensions since, by definition, they are common to two distinct views. However, the position of the two interpolated points, P' and Q' (FIG. 13) is only defined by one locus-line each, normal to the projection plane. The safest assumption is then that which
is the minimum departure from A'B', the straight line between the known end-points of the segment,
is certain to yield a better representation than the single line A'B'.
gives the mean of all possible positions.

These conditions are met if P' and Q' are projected on to the plane, through A' B', normal to the plane A'B'BA. (FIG. 14)

When one contour is intersected by 9 others, 18 common points are generated, separated by 20°. The center section of the 3-line approximation occupies 40% of this, i.e. 8° (and the two end sections are of equivalent accuracy). Since the approximation error is equally distributed on either side of the straight line, the peak error, as a fraction of the local radius of curvature, is $$\hat{e}=(1-\cos 4°)/2=1.22\times10^{-3}.$$

For 30 views the equivalent error would be $1.1\times10^{-4}$. This is an unrealistic figure, but, with single straight lines directly joining the endpoints of the curved segments, it is reduced to $1.47\times10^{-3}$ similar to ê above. This roughly matches the limiting accuracy of practical sensor systems.

The worst-case measurement error arises when two projection lines intersect at the minimum angle, i.e. 45°, at the maximum distance from the sensor surface D. An angular error $\epsilon$, in the orientation of the source, would then result in a positional misalignment of D $\epsilon$ sec45°. Hence a precision of $10^{-3}$ D would entail $\epsilon \leq 0.04°$, probably roughly the limit of the likely mechanical alignment of practical commercial systems.

Thus we have converted the circumference of an N-sided mesh cell into a non-coplanar polygon of 3N sides. We now represent its surface by the most appropriate set of 3N-2 triangular facets, by constructing a quasi-optimum set of 3N-3 diagonals between appropriate points on this circumference:

Since all such diagonals should link points on disparate 3-line approximations, none can start at a junctions between disparate approximations. Hence these N junctions are 'cut off' by diagonals linking the nearest points on either side, producing an inner mesh of 2N corners and sides. We then 'cut off' that corner of this inner mesh requiring the shortest diagonal, so reducing the order of the residual mesh by 1, and repeat this process until, finally, a quadrilateral is reduced to two triangular facets 151,153. (FIG. 15)

The four points are the basic mesh nodes; the other eight points arise from the three-line approximations. Thus an originally four-sided mesh is represented by ten, and a three-sided one by seven triangular facets. This representation yields dramatic savings in computation for image manipulations, such as rotation or slicing. Moreover, on completion of all such operations, we can smooth the resulting surface, and so obtain an excellent reproduction of the continuously-curved real surface.

Our 'objects' may well be less than physiological entities. Our mechanism creates a distinct additional 'object' wherever boundaries are created, by any of the following: (FIGS. 16a to 16d)

1. A maximum of the modulus of the density gradient 161.
2. A discontinuity in texture type 163.
3. A discontinuity in a texture's orientation 165.
4. A discontinuity in a texture's lateral alignment 167.
5. In a proposed extension of the technique: a 'watershed' in the blood-supply to adjacent and otherwise possibly indistinguishable regions of tissue.

Item 1. implies that an abrupt excrescence or cavity in a single functional entity would split it into two distinct 'objects', in each projected view, and hence in the derived three-dimensional representation. However, the data analysis will note the common interface. Furthermore, in an excrescence it will note the common specific density, and in a cavity the reduction of the specific density to that of the filling medium, if any. (In many cases, the cavity may in fact be treated, as a projection from an adjacent physiological entity.) In all instances, there is sufficient information for associating multiple constituent 'objects' to form the corresponding physiological entities. The mechanisms listed above will normally generate a rather fuzzy and 'noisy' representation of an object's edge. In order to obtain a best-estimate sharp outline, and to condense the data into an amenable format, we convert the input data into a concatenation of 'least mean square error' second-order polynomials.

The span length of these polynomials is adaptively adjusted, in constant-ratio steps, to keep the error within specified upper and lower limits. The starting point of each polynomial is the end of the previous one, and the end-point is the mean of the 'raw' edge points within a specified limit of the postulated span length from that start. The process is automatic, but with provision for optional operator intervention.

In practice we are faced with multiple entities. Each of these generates its own independent set of points and surface-mesh network, matched to its own size, shape and structural complexity. However, two or more such entities 171, 173, 175 are likely to overlap, as illustrated in FIG. 17. We have therefore devised a method for resolving such compound views into the constituent objects, using criteria such as continuity of edge direction and/or of edge characteristics, and continuity of local density and/or of density gradient, within each constituent object.

As with a single object, the first step is to find all edges and to represent them as chains of 2nd order polynomials. There are three versions 181-185 of T-junctions between such contours, see FIGS. 18a to 18c, and three variants 191-195 of cross-overs, see FIG. 19a to 19c. (Variant 195 can arise in any of four orientations.) The principal tool for resolving cross-over ambiguities is a local density comparison.

The points being compared should lie on parallels to the relevant edges, to be on probable equidensity contours, but not too near the edge, where the density gradient is maximum and measurements would be error-prone. For convenience, we displace the edge segment a suitable spacing d normally to its tangent at the cross-over point. (Four distinct values of d could be used: two sides of two boundaries.)

Although the edges are unlikely to be straight or to cross at right angles, we shall here, for ease of notation, treat them as the X and Y axes, with the origin at their intersection. Thus we determine the following densities (See FIG. 20)

$D_1$, in quadrant 1 at point +d, +d;

$D_2$, in quadrant 2 at point −d, +d;

$D_3$, in quadrant i at point −d, −d;

$D_4$, in quadrant 4 at point +d, −d;

Then, if $D_1-D_4=D_2-D_3=\Delta D_y$, the X axis is the lower edge of an object of local density $\Delta D_y$ (at distance +d from that edge). Similarly, if $D_1-D_2=D_4-D_3=\Delta D_x$, the y axis is the left-hand edge of an object of local density $\Delta D_x$ (at distance +d from that edge). Thus we proceed from 'initial objects', defined by single closed boundary loops to 'intermediate objects', corresponding to multiple adjoining closed loops. Even these can however be the result of overlaps between a smaller number or larger true 'final objects'. The resolution of multiple overlaps can be simplified by working outwards from those 'final objects' which have already been positively identified.

This overlap resolution process is performed in each of the ten or more views. The common identity of a given object is maintained, from view to view, by noting the common locations of its extremities (and of other key features), as projected on to the axis common to a pair of views. The same process can also be used to resolve any doubt, when analyzing potential overlaps in a specific view, e.g. to establish whether a high-density region on one view is a small object in its own right, or is the result of an overlap between too larger objects. If, exceptionally O(p,1), i.e. object p in view 1, cannot be directly identified with O(p,2), it should certainly be identifiable via one or more intermediate views:

$$O(p,1) \rightarrow O(p,x) \rightarrow O(p,y) \rightarrow O(p,2).$$

When two projection planes are at right angles, the identity of a given object in the two views, inferred from common end-points, cannot be confirmed by a comparison of shapes except via a suitable intermediate view. For the time being, we allow for some optional operator intervention in overlap resolution.

Figure 22:
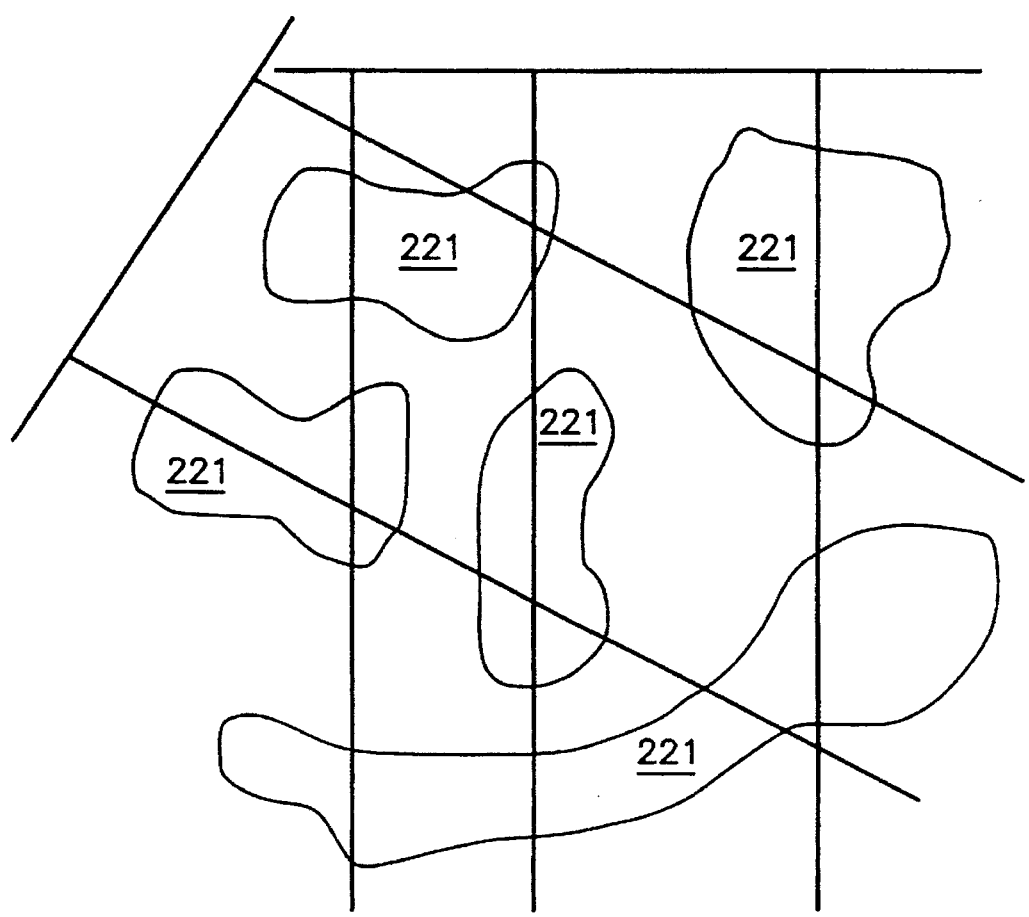

In our starting assumption, we postulate that each object has a consistent specific X-ray density, S. Hence the aggregate density, as seen at a point P, projected in direction $\Theta$ (FIG. 21) is the product of S and d, the depth of penetration of the relevant ray. If this ray does not penetrate any additional objects of unknown density, we obtain S directly. If the ray penetrates m objects 221 of unknown S but known d, (FIG. 22) the aggregate density is $$D=\Sigma d_i S_i, (1 \leq i \leq m)$$

Hence m such equations suffice to define all m specific densities.

The position of the sampling rays is determined, primarily, from superimposed outlines in the plane normal to the proposed ray direction. It is chosen, by inspection or analysis, so that:

Each object is penetrated by at least one ray;

Each ray penetrates as few objects as possible;

Each ray is as far as possible from the edge of any object penetrated by it.

When many rays are required, these are distributed substantially uniformly between all the available source views.

Multiple rays within a given view are as widely separated as the other criteria permit.

Preferably also

The smallest object penetration depth associated with each ray is as large as possible;

The penetration entry and exit angles are as nearly as possible normal to the relevant surfaces.

Normally m simple equations are sufficient, since extreme precision in the estimate of specific X-ray density is rarely required. However, we may improve the signal/noise ratio, by averaging the densities of a small number of adjacent pixels and/or undertake some redundant sampling at distinct locations.

A simple 'rule of thumb', for redundant input equations, would be:

Find the equation with the smallest object penetration $d_i$ and add it to the equation with the next smallest $d_i$, for the same object i.

Repeat the process until the matrix has been reduced to m non-redundant equations.

Alternatively, standard techniques for solving redundant matrices produce 'least-mean squared' error results, enhancing both accuracy and stability. Furthermore, the variance so derived indicates which objects should be treated as 'variable density', and the covariance identifies mutual dependencies of density values.

Figure 23:
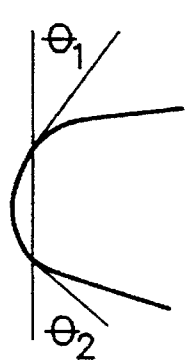

Ideally the error liability of each term in the redundant matrix could be deduced, from the departure of the associated surface entry and exit penetration angles from the normal, and the combined estimate could then be weighted accordingly. (FIG. 23) However, this refinement is unlikely to be warranted, in practice.

The triangular facets penetrated by a sampling 'ray' may be identified as follows:

Make the projection ray the Z axis. From the signs of X and Y check that one corner, say A, is the only one in its quadrant, and that at least one of the other two corners, B and C, is in the diagonally opposite quadrant. This is excellent for short-listing. However, to guarantee that the resultant triangles include the origin O, requires the further condition that corners B and C be on opposite sides of line AO.

Once we know the specific densities, we can compute density profiles:

for any desired direction of view, after any proposed selection of objects after slicing to remove undesired parts of these objects. The projected vertices form ideal sampling points, since they match the underlying information, and the closeness of their projected spacing matches the steepness of the corresponding surface gradient.

The contribution to an object from sampling points on its outline will be explicitly zero. We can trace the outline as a continuous path, without involving irrelevant vertices, as follows:

Find an initial point on the outline of the object by looking for the vertex with the smallest (or largest) X (or Y).

From that vertex, (and subsequent edge vertices) find the edge that leads to another vertex at which there is zero depth of penetration through the object, Finish when the initial vertex is regained.

Any smoothing across object boundaries would blur the outlines, However the density profiles can be refined smoothing, within the projected outlines of the relevant objects, e.g, as follows.

Construct a tentative set of appropriate square macro-pixels,

When a macro-pixel includes one vertex, assign it the density of that vertex.

When it includes several vertices, subdivide this macro-pixel in binary steps until none of the reduced pixels contains more than one vertex.

Figure 24:
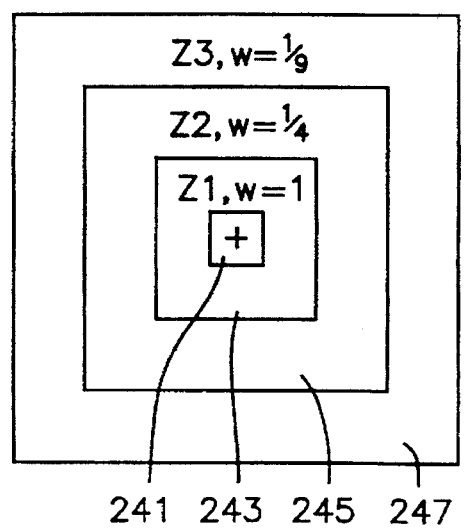

Macro-pixels not including a vertex derive their density from the four nearest vertices. For this purpose, all vertices spread their influence outwards in successive concentric square zones 241–247, one macro-pixel wide (FIG. 24), The zth set of zones has the associated weight $1/z^2$. Each relevant pixel notes the first four densities and weights reaching it, to derive its density $D'=\Sigma(D/z)^2/\Sigma(1/z)^2$. The process is terminated when the need of all macro-pixels is satisfied Realistic densities facilitate comparison with conventional X-rays. However, for the best computer-generated images, the user may interactively ascribe any convenient densities to the objects, Density mapping is desirable mainly because of its familiarity from conventional X-rays. With our full specification of the three-dimensional surface of each object, we can easily select only wanted objects, discard those that obstruct the desired view or show only their outline, producing a transparent projection of multiple overlapping objects.

We can then bring out the three-dimensional shape of the wanted objects e.g. by contour lines, as in a map, or visually by computing and displaying the pattern of light scattered from the object's surface, when illuminated from any selected direction.

Figure 25:
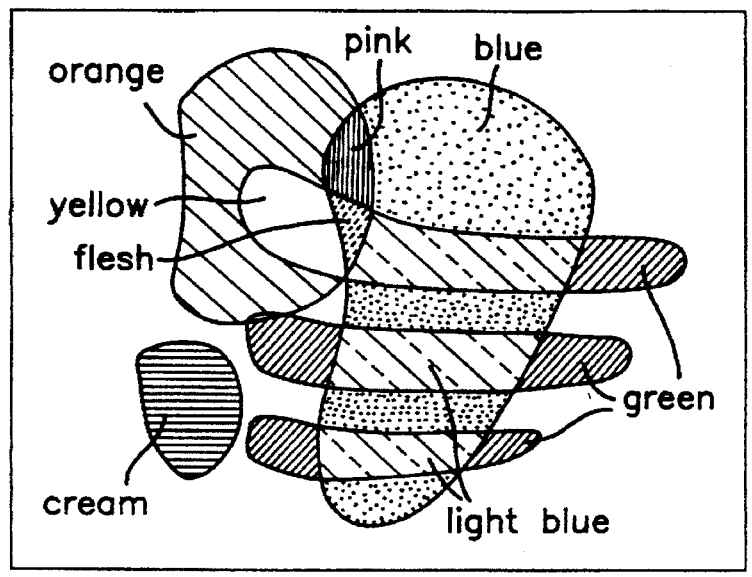

We can distinguish objects 251,253 by giving them distinctive colors and/or filling them with distinctive patterns, see FIG. 25. We can also 'rotate' objects, to view them from any desired angle, by a simple coordinate rotation of the relevant surface points.

We can also view everything beyond a selected 'slicing' plane. If we make the slicing plane Z=0, triangular facets intersected by that plane are identified by the fact that their corners, jointly, include both positive and negative values of Z.

Every-day experience is best matched by opaque projection where a nearer object obscures any more distant one. The relevant objects (or their unobscured parts) are normally represented by their outline, with appropriate distinctive colouring or patterns, or by their simulated surface reflectance.

To assess obscuration, we first rotate the coordinates to make the direction of projection the Z-axis. Then we define the rectangular boxes, in X, Y, Z, which just contain the objects. When there are no sub-regions of the total volume common to two or more such boxes, we choose the box with the smallest minimum Z, i.e. the object with the nearest near-point, insert that objects outline on the display, and mark all pixels within that outline as 'obscured'. We then repeat this process with the box of the next smallest minimum Z, but this time omit from the outline area any pixels already noted as 'obscured'. This process is continued for consecutive further boxes, deleting however any boxes whose X, Y dimensions are wholly within the area already obscured. We finish when all the picture area has been obscured, or else all boxes have made their contribution or been eliminated.

Figure 26:
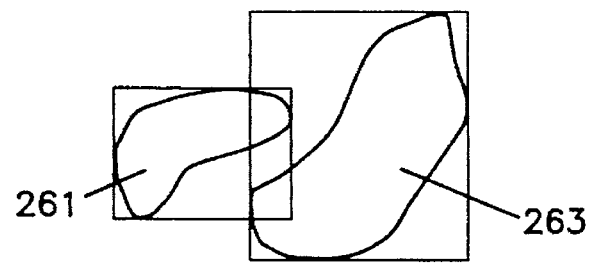

If and where two (or more) boxes share a common volume, there is a possibility the 'farther' object 261 could locally overlap the 'nearer' one 263, (i.e. that nearer at its nearest point). (FIG. 26) We therefore find their first intersection (if any) of the relevant projected X, Y outlines. If, at this X, Y, object A has a smaller Z than object B, then A is in front, and so obscures B, in the common area, up to the next intersection of the outlines.

Ambiguities could however arise if:

the 'nearer' object 271 is re-entrant (i.e. folded over); and the nearer leaf of the fold-over is smaller than the farther one 273; and the farther object 275 penetrates into the fold.

Figure 27:
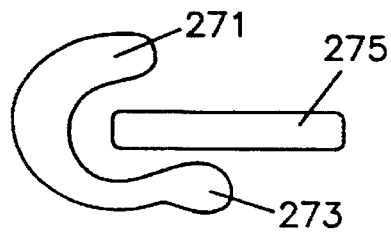

See FIG. 27. Such situations can be resolved from outline projections normal to the X and Y axes and the density profile normal to the Z axis (with provision for operator intervention). Alternatively, wherever the enclosing boxes overlap, we might show the outline of the object 'nearer' at its nearest point normally, and show that of the farther object dotted where the outlines overlap and normally elsewhere.

If aggregate densities were expressed by their logarithm, common scale factors would appear as spatial "dc" components, which could be filtered out or scaled down as desired, the "ac" components would represent density ratios. In the absence of noise, this normalization would define the edges of "weak" objects just as clearly as those of "strong" ones. Furthermore, the edge of an object, where its contribution to the aggregate density declines to zero, would be dramatically enhanced, since its logarithm, if unmodified, goes to minus infinity.

In practice we want to:

avoid negative densities avoid infinite values maintain the same dynamic range of values as with the linear scale.

If the linear dynamic range was 1 to 1000, and the logarithms are to base 2, we would therefore represent a linear density D by $$D'=100\ \log_2(1+D).$$

This form of non-linear amplitude scaling does not merely help edge extraction, it commonly also yields a more useful display. A flexible compromise density would be:

$$D''=\alpha D'+(1-\alpha)D.$$

A subset of objects may be identified, from the variance of their initial, single density value, as being of variable density. These objects (or at least the sub-subset designated by the operator as of diagnostic importance or others, where the covariance shows that they affect objects of diagnostic importance), can be treated as an array of cellular subobjects with independent cell-densities. We assume that the density variations are relatively smooth, since any abrupt discontinuity would have generated an 'interobject' boundary. Thus the resolution for mapping within-object density variations can be substantially coarser than that defining the object's surface. Hence we characterize the relevant objects by a parameter k which, roughly, represents the number of distinguishable density steps per linear dimension:

Let the object 281 be contained in $\Delta X$, $\Delta y$, $\Delta Z$, where $\Delta X.\Delta Y.\Delta Z \equiv L^3$.

Figure 28:
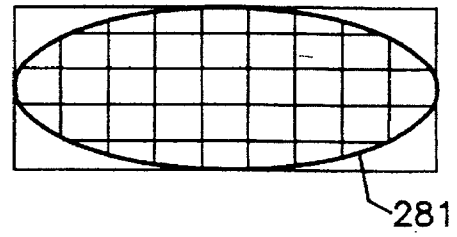
Figure 29:
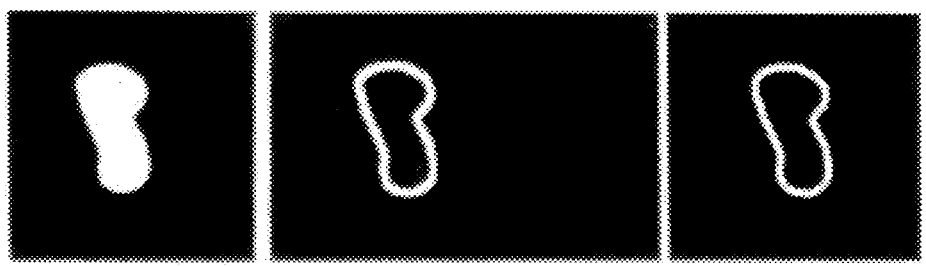
FIGS. 29 to 36 are computed reconstructions of a bone.
Figure 30:
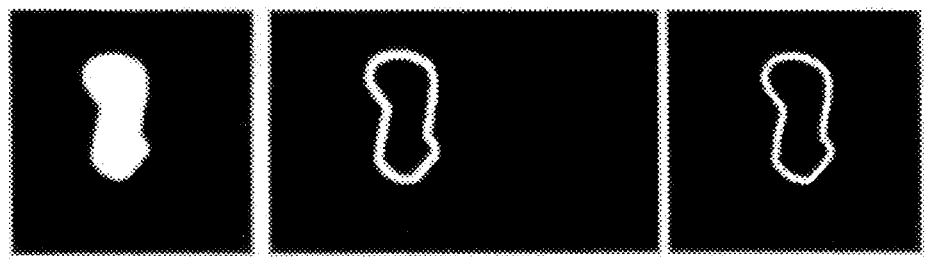
Figure 31:
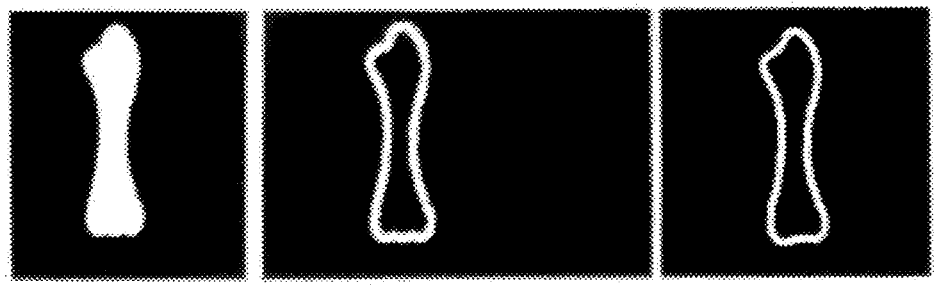
Figure 32:
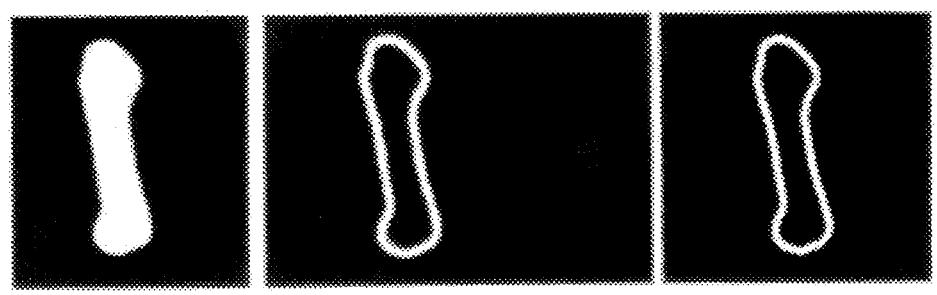
Figure 33:
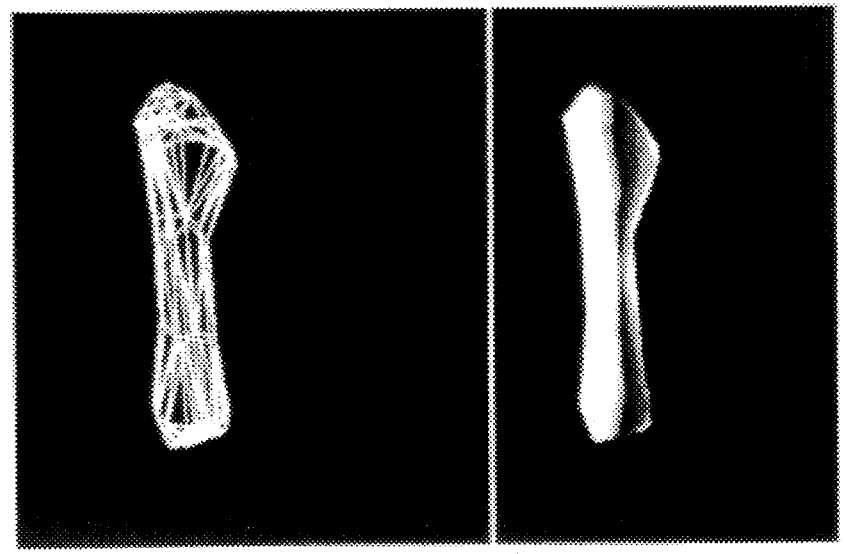
Figure 34:
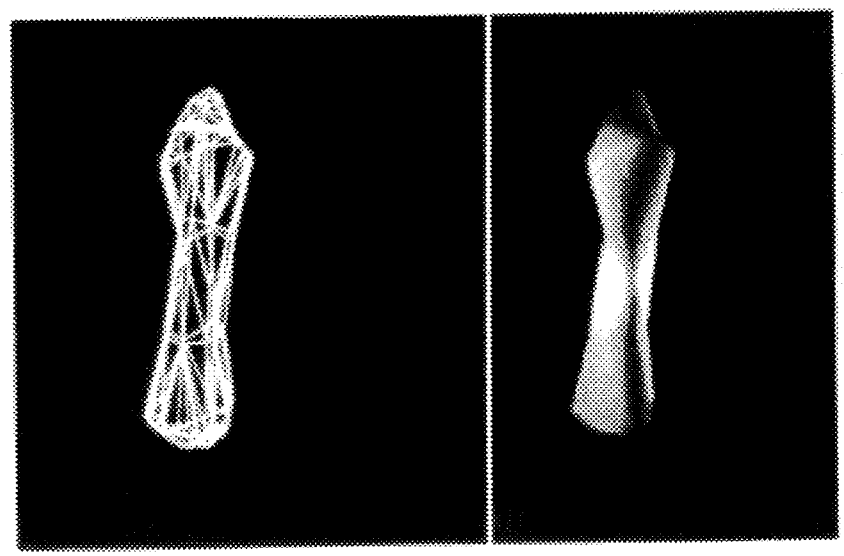
Figure 35:
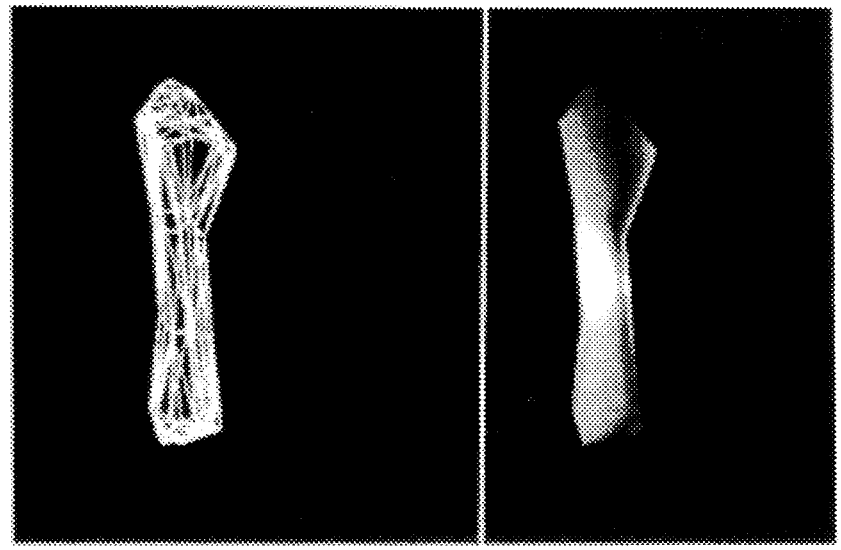
Figure 36:
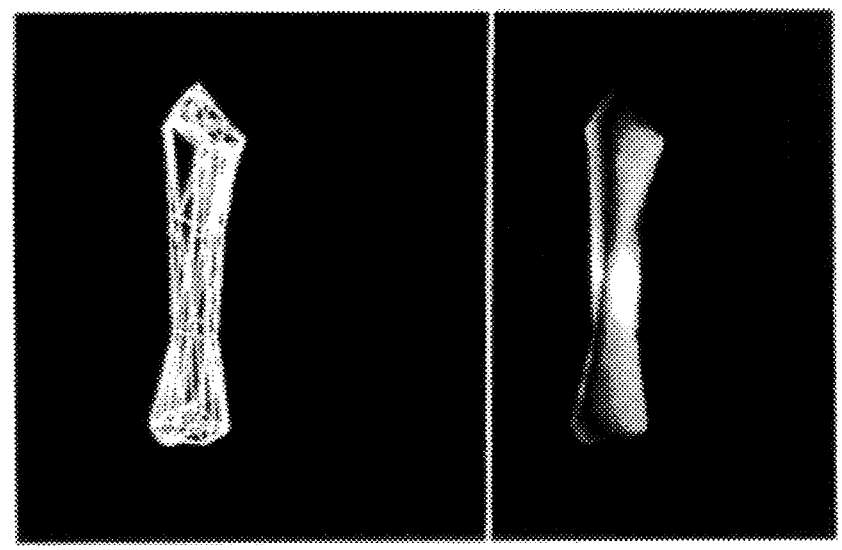

Divide the 'box' $\Delta X$, $\Delta Y$, $\Delta Z$ into $k^3$ cubical cells of side L/k. The object will then occupy a little less than $k^3$ cells, the interior ones cubical, but the peripheral ones bounded by the surface of the object. (FIG. 28) Each object would be assigned an appropriate k, say $5 \leq k \leq 25$. Typically k=10, yielding $\approx$1000 cells with potentially distinct densities, stored as one word each. The cell locations within the 'box' would be identified by their position within the block of $k^3$ storage locations, and absolute position would be defined by fixing one corner of the box. Hence a variable-density object with 1000-cell boxes would only increase by 10% the total storage requirement for fixed-density objects, with ten views (See analysis below and Table 8). The regular array of cubical cells is very convenient for creating views parallel to any desired axis.

Each view of 1,000 by 1,000 pixels provides $10^6$ independent data points. Hence a total of 10 such views could resolve up to $3 \times 10^7$ independent cell densities. This corresponds to the limits detailed in Table 4:

Thus the potential input information represents no significant restriction on the variable-density objects. Indeed, there should normally be substantial scope for averaging over groups of associated input pixels, and for taking redundant independent density samples, in order to enhance the signal/noise ratio in determining the individual cell densities.

When the relevant 'objects' are embedded within some form of background tissue, this has its own boundary, and simply constitutes an additional object.

Any points, lines, or other small-scale features which do not qualify as 'objects', should add little to the aggregate density integrated over a ray. Their effect will be further diminished by the weighted averaging of density values derived from several rays. At worst, these features produce a small error in the computed specific densities of the objects. We can then view and manipulate the objects as before, independently of the non-object-like matter.

If, however, we want to view the non-object-like matter, we first compute the object-related density profile in the direction of any of the source views. We then subtract this from the source-view intensity pattern, so that any small-scale features (in front of, behind, or indeed within the objects) are no longer obscured by those objects. Since some of these non-object-like features may relate to the objects, we may include the objects' outlines in these synthetic pictures. (In a borderline situation, features could be too small and numerous to be handled as objects, but too large to be treated as non-object-like.)

In conventional or wide-fan CT, all relevant material is exposed to (typically) 1,000 separate irradiations. This constrasts with, say, ten for the object-based scheme—a 100-fold reduction. In addition, however, there is an equally dramatic reduction in the source intensities required. This arises because object boundaries have to be identified, rather than individual voxels. Each boundary point benefits then from:

Continuity over a bracket of at least (say) 5 boundary points;

A progressive density trend, observed over a strip at least 5 pixels wide, inward from this boundary;

Integration in the depth dimension, for each pixel, over a column of an average height of at least 5 voxels.

Jointly these three factors provide a 125-fold (minimum) signal/noise ratio enhancement, i.e. 21 dB. Indeed, contrasting the intensities used for normal X-rays (about 0.05 units) with those of the individual computer tomography irradiations (typically 100 units) suggests that this estimate of the reduction achievable is very conservative—or else that computer edge-detection is some 16-fold inferior to the capability of the human eye. Thus, combining the number of exposures and their intensities, the total effective exposure is reduced more than $10^4$ fold.

A wide-fan computer tomography system, with a $10^6$-pixel slice-plane resolution, a slice width of 20 voxels, and a total of ten slices, would have a total input of $2 \times 10^8$ density words. A standard computer tomography system of 40 slices of $10^6$-pixels each would have a total input of $4 \times 10^7$ density words. An object-based system with 10 views of $10^6$-pixel each would have a total input of $10^7$ density words. (But the less stringent signal/noise requirements would permit the use of a shorter word.)

In the two computer tomography systems, the dominant computational load is that of resolving the densities of the constituent voxels or pixels, respectively, and so is directly proportional to the input data, above. By contrast, in the object-based system, the computation is mainly dependent on the number of primary surface points generated (i.e. excluding the 3-line approximations). This is estimated below to be 400 points per object. These computations have of course to be weighted by distinct scale factors: For the computer tomography systems the quantity of computation per voxel is greater, but for the object-based scheme the complexity of the computation is greater, and so it is less suitable for a specialized array processor. For the present, we ignore these differences.

The wide-fan volume was postulated to comprise $V = 2 \times 10^8$ voxels. If this is in fact made up of n objects, their average linear dimensions will be $d^* = (V/n)^{1/3}$. If we now reduced the stored data to those voxels lying on the surface of objects, the number of voxels to be stored would be reduced by the surface-to-volume ratio of a sphere, i.e. $4 \times 3\pi r^2/4\pi r^3 = r/3 = d/6$. Making some allowance for objects of more complex shape, $d^*/10$ is a more realistic figure, resulting in $10V^{2/3}n^{1/3}$ surface voxels. However, we would then have to note the position of each such voxel in three co-ordinates, in addition to its density. (Previously position could be implied by storing all voxels in a predetermined pattern.) Hence the storage requirement is only reduced in the ratio $40/(V/n)^{1/3}$. Standard computer tomography has less input information and very crude information in the axial dimension (and accordingly fewer but larger voxels). The ratio of edge pixels to total pixels within a slice is then the same as the voxel ratio above. In this case, however, each pixel needs only two position co-ordinates in addition to the density, and so reduction factor is then $30/(V/n)^{1/3}$.

In the object-based scheme, with ten views, each object involves 90 contour intersection points per monotonically curved object surface. Making a generous allowance for possible complex re-entrant shapes might increase this total to, say, 400 points—plus a further 800 points arising from the three-line approximations, all associated with three position co-ordinates. In addition, let us allow for an average of four pointers linking these points to the storage addresses of other points and, for the contour intersections only, four pointers to the associated mesh cells. (The various pointers, whilst not essential, can save much subsequent computation.) This gives a total of $10^4$ n words. (On the same basis ten views of n objects, with the nodes joined by single straight lines, would require $4 \times 10^4$ n words.)

The above comparisons are collated in Tables 5–8. It will be noted that 'Object 3D' always yields a quite dramatic savings in radiation exposure, and a very substantial saving in input data and in computation. Even when the voxel data are reduced to surfaces only, for a reasonable numbers of objects; object 3D yields a dramatically more compact and efficient data representation. Hence, compared with the alternatives, it requires only minimal computer storage or processing power for inter-active, friendly user facilities. It benefits further, because the object concept matches the user's own perception, because of the computational efficiency of pointer-linked data structures, and because of the intrinsic simplicity of our surface representation:

Rotation only entails coordinate conversion for a set of 3D points.

Slicing merely involves finding the set of straight lines cut by the slicing plane.

An object's outline, in any direction of view, merely consists of the relevant set of edges.

(An outline can never lie within a triangular facet.)
However, for 1000 or more objects, most of this advantage in the storage and manipulations of processed data is lost.

Its relatively modest data and computational requirements and its user-friendliness could make the object-based technique suitable for a substantially expanded market of existing and new applications, in medicine in manufacturing industry, for quality-control, inspection (including comparison with a computer-stored reference), and metrology), for customs-examination and security-inspection at ports, airports and sensitive sites.

The scheme need not be limited to X-rays: it can be applied to any transmission-type imaging systems, such as: infra-red or neutron radiation, and positron emission. Furthermore, conventional X-ray tomography, computer tomography, acoustic imaging, and magnetic-resonance imaging all generate their information as a stack of cross-sectional slices. On each of these slices, edges could be detected and objects outlined, as in our process. These edges can then be defined as a succession of straight-line segments, and the corners of a given object, in consecutive slices, can be joined to create triangular facets, as illustrated in the next section. (The objects' identity can easily be tracked from slice to slice.) Thus these other sensor modalities can use—and benefit from—the same software, the same economy in picture storage, manipulation and transmission, and the same object-based user facilities—even though they do not benefit from our economy and optimization in data acquisition and minimization of sensor exposure. In addition to software, hardware, and user-interface standardization, this may permit the synergistic combination of multi-sensor data.

The requirement to interpolate between slices to generate 'best-estimate' three-dimensional objects is common to all slice-based three-dimensional data acquisition systems, and a number of these use triangular facets for surface representation. This requirement could be met, in a manner consistent with the three-dimensional object-based imaging scheme, as follows:

In each slice, detect the edges of objects.

2. Represent each edge as a succession of polynomials.
3. Represent each polynomial segment by a three-line approximation, thus generating two additional 'nodes'.
4. Identify cross sections of the same object, in successive slices, by their correlation.
5. For each distinct object, and each relevant pair of consecutive slices, form a set of triangular surface-facets, as defined in steps 6–11.
6. Start at an arbitrary node, N(L,1), on one of these slices. (say L, the lower one of a pair)
7. Find N(U,1), the nearest node in the other slice. (In this case, slice U, i.e. the upper one)
8. Test whether this link is also the shortest one from N(U,1) to any node in slice L.
9. If NO, move to the next node clockwise from N(L,1) and then return to step 7.
10. If YES, find the shorter of the links N(L,1)→N(U,2) and N(U,1)→N(L,2), where in each case 2 denotes the next node clockwise,
11. Select that link and, in relation to it, return to step 10.
12. When, eventually, the link so found is again the initial link first found in step 10, END.

Initial experiments used single computer-generated ellipsoids of revolution, and computed their projected outline in specified directions of view. They then derived the points common to pairs of outlines and joined them up in single straight lines (rather than three-line approximations to the relevant arc). This proved the principal software modules.

Next we used multiple, computer-generated ellipsoids of revolution, differing in size, length-to-diameter ratio and three-dimensional position, in order to prove our overlap-resolution procedure.

We then repeated the initial experiment, with ten suitably distributed outlines of the ellipsoid, and fitted the appropriate three-line approximations to the resulting contour segments, to confirm the accuracy of the reconstituted surface.

We also acquired a plastic replica bone (as sold for pet dogs). For simplicity, we embedded this bone in a foam-plastic sphere, which could be placed, in any desired orientation, on a foam-plastic annulus between the source and plate of a conventional X-ray machine. Even with only five views, this produced quite realistic-looking three-dimensional reconstructions, but the accuracy was limited, because the foam plastic sphere did not keep its shape, and because the X-ray apparatus had no provision for precise angular alignment. (A 1° alignment error could result in a positional error of up to 2.5% of the X-ray-source-to-plate spacing.) This scheme entailed also errors in lateral alignment, both in the initial position of the X-ray plate and in its subsequent scanning into the computer.

Hence three specific, mutually orthogonal views were aligned with each other, on their common axes, and were then designated as 'reference masters'. The common-axis projections of all other views were then aligned with those masters. This produced the computed pictures shown in FIGS. 29–36. FIGS. 29–32 show four different views of (a) the raw X-rays of a nylon bone (b) the edges extracted from (a) and (c) the multiple-polynomial graphical representation of (b). FIGS. 33–36 show (a) 3D wire frames of the nylon bone at different orientations reconstructed from five raw X-rays and (b) rendered views of (a).

Next we arranged to cast a higher-density copy of the same 'dog-bone' which could be mounted inside a rigid plastic sphere, giving adequate X-ray contrast relative to the spherical shell. For the sphere we chose a geographic globe, since this was already marked with appropriate angular co-ordinates. We then attached an aiming telescope to the X-ray apparatus, for better angular alignment.

Other experiments proved the extraction of specific density and the reconstruction of computed density profiles for single and multiple fixed and variable density objects. Yet others applied angiography (dye injection into the blood supply) to provide enhanced images of the human kidney for object-based three-dimensional imaging.

TABLE 1

Characteristics of ideal CT system

| | |
|---|---|
| Resolution | 1,000 lines |
| Approx. No. of pixels | 1,000,000 |
| No. of dots per line view | 1,000 |
| No. of pixels integrated in each dot | 1,000 |
| No. of views to define all pixels | 1,000 |

TABLE 2

True 3D CT voxel-based system

| | |
|---|---|
| Resolution | 1,000 lines |
| Approx. No. of voxels | 1,000,000,000 |
| No. of pixels per view | 1,000,000 |
| No. of voxels integrated in each pixel | 1,000 |
| No. of views to define all voxels | 1,000 |

TABLE 3

Common 3D points from multiple 2D views

| | |
|---|---|
| 25 min No. of 3D points per pairing of views | 2 |
| min No. of 3D points for n views | n.(n.1) |
| min No. of 3D points for 10 views | 90 |
| min No. of 3D points for 30 views | 870 |

TABLE 4

Limiting No. of variable density objects

| k | Cells per box | Limiting No. of objects |
|---|---|---|
| 5 | 125 | 240,000 |
| 10 | 1,000 | 30,000 |
| 25 | 15,600 | 1,900 |
| 100 | 1,000,000 | 30 |

TABLE 5

Comparison of Exposure.

| | Relative Irradiation |
|---|---|
| Wide Fan CT | $10^4$ |
| Normal CT | $10^4$ |
| Object 3D | 1 |

TABLE 6

Input Data

| | |
|---|---|
| Wide Fan CT | $200 \times 10^6$ |
| Normal CT | $10 \times 10^6$ |
| Object 3D | $10 \times 10^6$ |

TABLE 7

Comparison of Data Points and Computational Load

| n | 1 | 10 | 100 | 1000 |
|---|---|---|---|---|
| Wide Fan CT | | | $2 \times 10^8$ | |
| Normal CT | | | $4 \times 10^7$ | |
| Object 3D | $1.2 \times 10^3$ | $1.2 \times 10^4$ | $1.2 \times 10^5$ | $1.2 \times 10^6$ |

TABLE 8

Comparison of Processed (Surface-only) Data.

| n | 1 | 10 | 100 | 1000 |
|---|---|---|---|---|
| Wide Fan CT | $4 \times 10^6$ | $9 \times 10^6$ | $20 \times 10^6$ | $40 \times 10^6$ |
| Normal CT | $0.6 \times 10^6$ | $1.3 \times 10^6$ | $3 \times 10^6$ | $6 \times 10^6$ |
| Object 3D | $10^4$ | $10^5$ | $10^6$ | $10^7$ |

Figure 37:
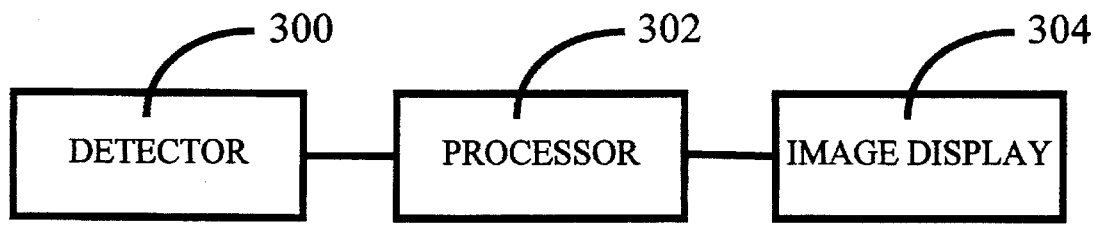
FIG. 37 shows a processor receiving a signal from a detector and providing an image signal to an image display.

FIG. 37 shows a processor 302, which forms processing means, receiving a signal from a detector 300, e.g., the two-dimensional sensor 41 shown in FIG. 7, which forms detector means, and outputting a display signal to an image display 304, which forms image display means.

I claim:

1. A method of generating images of a specimen containing at least two regions of different opacity to a transmission of radiation therethrough, said method comprising steps of:
   irradiating said specimen with radiation from radiation source means;
   detecting said radiation with radiation detector means sensitive to said radiation, said detector means producing a plurality of signals indicative of an amplitude of said radiation passing through said specimen in a corresponding plurality of different directions;
   deriving further signals, from said plurality of signals, indicative of contours of maximum local discontinuities in at least one of opacity and texture, said further signals providing an indication of a position of a three-dimensional boundary surface between said at least two regions of different opacity.

2. A method of generating images of a specimen according to claim 1, wherein:

a number of said plurality of signals is between four and one hundred.

3. A method of generating images of a specimen according to claim 2, wherein:

said number of said plurality of signals is between ten and thirty.

4. A method of generating images of a specimen according to claim 2, wherein:

said plurality of different directions are substantially uniformly distributed in a solid angle over a hemisphere.

5. A method of generating images of a specimen according to claim 4, wherein:

said plurality of different directions pass normally through corresponding predetermined points on faces of a regular polyhedron.

6. A method of generating images of a specimen according to claim 1, wherein:

said plurality of signals are generated by a corresponding plurality of radiation sources.

7. A method of generating images of a specimen according to claim 6, wherein:

said plurality of radiation sources are actuated successively so as to inhibit side-scatter excitation.

8. A method of generating images of a specimen according to any one of claim 1 to 7, further comprising a step of:

performing a local density comparison to resolve any cross-over ambiguities.

9. Apparatus for generating images of a specimen containing at least two regions of different opacity to a transmission of radiation therethrough, comprising:

radiation source means for directing radiation in a plurality of different directions through said specimen;

detector means to detect an amplitude of said radiation after passage through said specimen in each of said plurality of different directions;

processing means for processing signals produced by said detector means and deriving signals indicative of contours of maximum local discontinuities in at least one of opacity and texture within said specimen; and image display means for providing a readout of said signals indicative of said contours derived by said processing means.

10. A method of generating images of a specimen containing at least two objects of different opacity to passage of radiation, said method comprising steps of:

irradiating said specimen with radiation;

detecting an amplitude of said radiation after passing through said specimen in a plurality of different directions;

deriving a plurality of two-dimensional contours of said at least two objects of opacity to radiation corresponding to said plurality of different directions;

determining at least two maximum local discontinuities of each of said plurality of two-dimensional contours; and determining a position of said at least two objects in three-dimensional space from approximate intersections of said at least two maximum local discontinuities of each of said plurality of two-dimensional contours.

11. A method of generating images of a specimen according to claim 10, comprising a further step of:

determining triangular facets between adjacent ones of said intersections of said at least two maximum local discontinuities of each of said plurality of two-dimensional contours, for each of said at least two objects, so as to generate a three-dimensional image on a two-dimensional display which approximates a surface of said at least two objects.

12. A method of generating images of a specimen according to claim 11, comprising a further step of:

presenting said three-dimensional image on said two-dimensional display as viewed from any direction selected by a user.

13. A method of generating images of a specimen according to claim 12, comprising a further step of:

smoothing a density profile within said at least two objects without smoothing substantially across boundaries formed by said at least two objects.

14. A method of generating images of a specimen according to claim 12, comprising a further step of:

rotating said three-dimensional image so as to be viewed from any desired angle.

15. A method of generating images of a specimen according to claim 10, comprising a further step of:

interconnecting said at least two maximum local discontinuities of each of said plurality of two-dimensional contours by steps of:

determining a first outline of one of said at least two objects, and repeatedly determining subsequent outlines which cross each preexisting outline twice, thereby adding two mesh-cells per preexisting outline.

16. A method of generating images of a specimen according to claim 15, wherein said outlines of said at least two objects are determined by using at least one of:

a continuity of edge direction of said opacity to said radiation of said at least two objects;

a continuity of edge characteristics of said opacity to said radiation of said at least two objects;

a continuity of a local density of said at least two objects; and a continuity of a density gradient between said at least two objects.

17. A method of generating images of a specimen according to claim 15, wherein said outlines of said at least two objects are determined by steps of:

(a) finding an initial point on said outline by locating an initial vertex with an extreme value with respect to a coordinate of said two-dimensional contour;

(b) from said initial vertex and subsequent edge vertices, locate an edge that leads to another vertex at which there is zero depth of penetration through said corresponding one of said at least two objects;

(c) repeat step (b) until said initial vertex is regained.

18. A method of generating images of a specimen according to claim 10, comprising a further step of:

resolving densities of said at least two objects based on a number of primary surface points generated thereon.

19. A method of generating images of a specimen according to claim 10, wherein:

said specimen is irradiated with X-ray radiation.

20. A method of generating images of a specimen according to claim 10, wherein:

said specimen is irradiated with infra-red radiation.

21. A method of generating images of a specimen according to claim 10, wherein:

said specimen is irradiated with neutron radiation.

22. A method of generating images of a specimen according to claim 10, wherein:

said specimen is irradiated with positron emission.

23. A method of generating images of a specimen according to claim 10, wherein:

said plurality of different directions are non-coplanar directions which intersect in a vicinity of at least one of said at least two objects.

24. A method of generating images of a specimen according to claim 10, wherein:

said specimen is irradiated by a divergent radiation source.

25. A method of generating images of a specimen containing at least two objects of different opacity to passage of radiation, said method comprising steps of:

irradiating said specimen with energy;

detecting a response to said energy from a plurality of different directions;

deriving a plurality of two-dimensional contours of said at least two objects corresponding to said plurality of different directions;

determining at least two maximum local discontinuities of each of said plurality of two-dimensional contours; and determining a position of said at least two objects in three-dimensional space from approximate intersections of said at least two maximum local discontinuities of each of said plurality of two-dimensional contours.

26. A method of generating images of a specimen according to claim 25, comprising a further step of:

determining triangular facets between adjacent ones of said intersections of said at least two maximum local discontinuities of each of said plurality of two-dimensional contours, for each of said at least two objects, so as to generate a three-dimensional image on a two-dimensional display which approximates a surface of said at least two objects.

27. A method of generating images of a specimen according to claim 26, comprising a further step of:

rotating said three-dimensional image so as to be viewed from any desired angle.

28. A method of generating images of a specimen according to claim 25, comprising a further step of:

interconnecting said at least two maximum local discontinuities of each of said plurality of two-dimensional contours by steps of:

determining a first outline of one of said at least two objects, and repeatedly determining subsequent outlines which cross each preexisting outline twice, thereby adding two mesh-cells per preexisting outline.

29. A method of generating images of a specimen according to claim 25, comprising a further step of:

smoothing a density profile within said at least two objects without smoothing substantially across boundaries formed by said at least two objects.

30. Apparatus for generating images of a specimen containing an object therein, said apparatus comprising:

an energy source for directing energy through said specimen at said object;

a detector array arranged to detect a response to said energy from said object, said energy source and said detector array being capable of operation from a plurality of different directions with respect to said object;

processing means, for deriving a plurality of two-dimensional contours of said object from each of said plurality of different directions, for determining at least two maximum local discontinuities of each of said plurality of two-dimensional contours, and for determining a position of said object in three-dimensional space from approximate intersections of said at least two maximum local discontinuities of each of said plurality of two-dimensional contours.

31. Apparatus for generating images of a specimen according to claim 30, wherein:

said detector array is fixed diametrically opposite said energy source to detect an amplitude of a response to said energy after passage through said specimen;

said apparatus further comprising rotation means for rotating said energy source and said detector array around said specimen.

32. Apparatus for generating images of a specimen according to claim 30, wherein:

said detector array is a three-dimensional array.

33. Apparatus for generating images of a specimen according to claim 30, further comprising:

a plurality of said energy sources, said energy sources irradiating said specimen with radiation;

a plurality of said detector arrays corresponding respectively to said plurality of energy sources;

wherein said plurality of energy sources pass said radiation through said specimen in different directions.

34. Apparatus for generating images of a specimen according to claim 33, wherein:

said plurality of said energy sources operate successively.

35. Apparatus for generating images of a specimen according to claim 34, wherein:

each of said plurality of different directions corresponds to a direction from a center of a corresponding face of a regular polyhedron through a center of said regular polyhedron.

36. Apparatus for generating images of a specimen according to claim 34, wherein:

each of said plurality of different directions corresponds to a direction from corners of a corresponding face of a regular polyhedron through a center of said regular polyhedron.

37. Apparatus for generating images of a specimen according to claim 34, wherein:

each of said plurality of different directions corresponds to a direction from mid-points of edges of a corresponding face of a regular polyhedron through a center of said regular polyhedron.

38. Apparatus for generating images of a specimen according to claim 35, 36 or 37, wherein:

only about half of a total number of faces of said regular polyhedron correspond to any of said plurality of different directions.

* * * * *